United States Patent Office 3,506,774
Patented Apr. 14, 1970

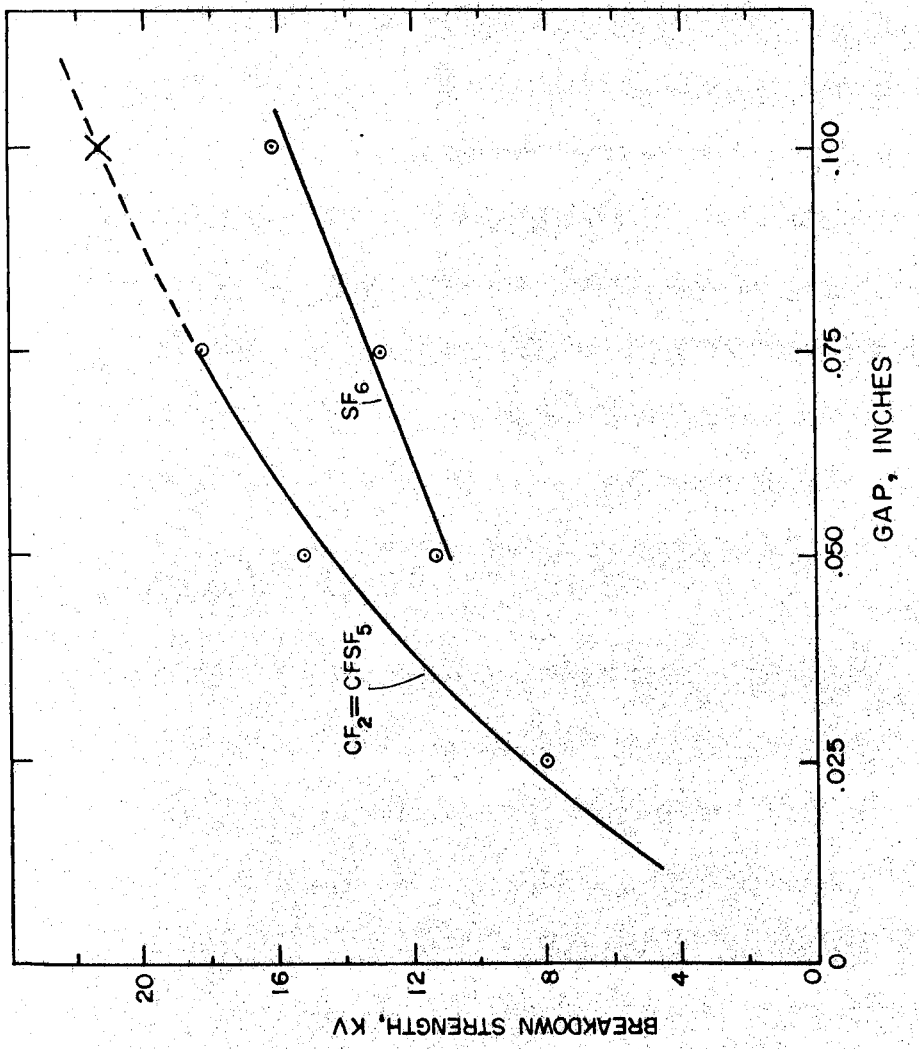

3,506,774
GASEOUS DIELECTRIC COMPRISING $CF_2=CFSF_5$
Gary L. Gard, Beaverton, Oreg., and Cyril Woolf, Morristown, and Ruth M. Shaw, Madison, N.J., assignors to Allied Chemical Corporation, New York, N.Y., a corporation of New York
Filed Dec. 2, 1966, Ser. No. 598,833
Int. Cl. H05k 5/06; H01b 3/16
U.S. Cl. 174—17                    3 Claims

ABSTRACT OF THE DISCLOSURE

Perfluorovinyl sulfur pentafluoride can be used as an electrical insulating gas in high voltage electrical apparatus. Perfluorovinyl sulfur pentafluoride had a dielectric or electrical breakdown strength higher than that of sulfur hexafluoride, which is extensively used commercially as an electrical insulating gas. Mixtures of perfluorovinyl sulful pentafluoride and sulfur hexafluoride have a dielectric strength which is greater than either compound alone.

---

This invention relates to the methods and apparatus for effecting electrical insulation.

A major objective of the invention is to provide a gaseous insulating medium which has high dielectric or electrical breakdown strength.

A further objective is providing a gaseous insulating medium which may be employed as an additive to gaseous dielectrics so as to produce a mixture which has higher dielectric or electrical breakdown strength than the gaseous dielectric to which it was added.

These and other objects and advantages of the invention will become more apparent upon reading the following detailed description of the invention.

The drawing shows a plot of values indicating dielectric strength to be described in more detail hereinafter.

Perfluorovinyl sulfur pentafluoride, $CF_2=CFSF_5$, is a known compound, disclosed for example in United States Patent 3,131,217. It is normally a colorless gas and has a boiling point of about 19 to 20° C. at atmospheric pressure, is a liquid at −78° C. and is a stable gas at temperatures of at least up to 200° C.

The invention is based primarily on the discovery of the dielectric properties of $CF_2=CFSF_5$. In accordance with the invention, we have found that perfluorovinyl sulfur pentafluoride has dielectric or electrical breakdown strength higher, when used alone or in mixture with other gases, than that of gases in use for insulating purposes, for example sulfur hexafluoride $SF_6$, a commonly used commerical gaseous insulating medium.

We find that perfluorovinyl sulfur pentafluoride used alone has electrical breakdown strength approximately 25% greater than that of sulfur hexafluoride under parallel conditions. Tests referred to herein were carried out in a "ball to plane cell" comprising a vertically disposed 2" internal diameter Pyrex tube 6" high. The lower end of the tube was secured in a gas-tight relation to a metallic base which included a ground terminal and a valve-controlled gas inlet opening into the bottom of the tube, to facilitate charging of gaseous dielectric. Projecting upward from the base and into the tube was a fixed electrode electrically associated with the ground terminal, coaxially disposed with the tube, and capped by a horizontally disposed brass disk 1.5" in diameter fitted onto the top of the tube in gas-tight relation with a circular metallic cap including a high voltage terminal. Projecting downward from the center of the cap was a vertically movable electrode coaxially disposed with the tube and carrying on the lower end thereof a ¾" steel sphere. The upper electrode, electrically connected with the high voltage terminal, was provided with micrometer facilities for raising and lowering the electrode to determine and fix the gap between the sphere and face of the disk (ball and plane, respectively), the combination of which afforder a substantially uniform field. The electrode terminals were connected to a 60 cycle A.C. supply and other known accessories to allow control of voltage and voltage rate rise across the gap, as well as observation of subject values. The power supply was limited to 20 kv. It is understood that the cell described has been proposed by the ASTM as standard equipment for use in determining dielectric strength of gas.

In a first series of tests, gaseous perfluorovinyl sulfur pentafluoride, after drying by passing the same through silica gel, was introduced into the cell to fill the same with $CF_2=CFSF_5$ at substantially one atmosphere pressore, temperature of apparatus and gas during all runs being about room temperature. The gap between the sphere and the disk was fixed first at about 0.10". The voltage power supply was limited to 20 kv., and the gas did not break down below that voltage. The electrode separation was then decreased and tests were made at smaller gaps; that is 0.050", 0.025", and 0.075". The tests were carried out at intervals of about 5 to 7 minutes in order to allow the system to return to equilibrium between breakdowns. The following data was obtained:

TABLE I

| Gap Separation | Breakdown Voltage, kv. | | | | | |
|---|---|---|---|---|---|---|
| | 1 | 2 | 3 | 4 | 5 | Avg. |
| 0.050" | 14.7 | 15.1 | 15.4 | 15.1 | 15.3 | 15.1 |
| 0.025" | 7.6 | 7.7 | 8.3 | 8.4 | 8.0 | 8.0 |
| 0.075" | 17.5 | 19.1 | 17.5 | 18.2 | 1.94 | 18.3 |

A plot of the average of the values of Table I was made and extrapolated to 0.10" gap distance; see the drawing. As plotted in the graph shown in the drawing, the breakdown strength of this larger separation (0.10" gap distance) is expected from the extrapolation to be about 21.5 kv. $SF_6$ tested in this cell under the same condition, that is one atmosphere pressure and 0.10" gap, breaks down at about 16 to 17 kv. The following data was obtained in a series of tests of $SF_6$ tested in the same cell at one atmosphere pressure and the described gaps:

TABLE II

| Gap Separation | Breakdown Voltage, kv. | | | | | |
|---|---|---|---|---|---|---|
| | 1 | 2 | 3 | 4 | 5 | Avg. |
| 0.050" | 11.2 | 11.4 | 10.9 | 11.4 | 11.5 | 11.3 |
| 0.075" | 12.1 | 12.6 | 13.2 | 12.7 | 13.5 | 12.8 |
| 0.100" | 16.1 | 15.7 | 16.0 | 16.0 | 15.6 | 16.1 |

The average data of Table II is plotted on the drawing as a curve for $SF_6$.

The extrapolation point of breakdown for $CF_2=CFSF_5$ is then about 21.5 kv. (and clearly above 20 kv.) which is 25% greater than the breakdown of $SF_6$ under the same conditions.

$CF_2CFSF_5$ may be used alone or as an additive to other dielectric gases, such as in combination with $SF_6$ or $N_2$.

The compound $CF_2=CFSF_5$ may be added, for example, to $SF_6$ or $N_2$ for use as a dielectric. The information appearing herebelow in Tables III and IV shows that an improvement in dielectric strength is obtained by addition of $SF_5CF=CF_2$ to $SF_6$ or $N_2$ respectively.

TABLE III

| Run | Percent $SF_6$ by vol. | Percent $CF_2=CFSF_5$ by vol. | Breakdown voltage (gap distance=0.075″) | | | | | |
|---|---|---|---|---|---|---|---|---|
| | | | 1 | 2 | 3 | 4 | 5 | 6 |
| 1 | 100 | 0 | 12.1 | 12.6 | 13.2 | 12.7 | 13.5 | 13.5 |
| 2 | 52 | 48 | 19.0 | 18.9 | 19.6 | 19.5 | 19.6 | 19.6 |

TABLE IV

| Run | Percent $N_2$ by vol. | Percent $CF_2=CFSF_5$ by vol. | Breakdown Voltage (gap distance=0.075″) | | | |
|---|---|---|---|---|---|---|
| | | | 1 | 2 | 3 | 4 |
| 1 | 100 | 0 | 5.5 | 5.7 | 5.8 | 5.7 | 5.7 |
| 2 | 89.6 | 10.4 | 9.2 | 9.4 | 9.3 | 9.8 | 9.7 |
| 3 | 67.4 | 32.6 | 12.6 | 13.5 | 13.2 | 13.6 | 13.7 |

The mixture of $SF_5CF=CF_2$ and either $SF_6$ or $N_2$ may be in any proportions desired by the user. The tests summarized by the data of Tables III and IV were obtained under the same test conditions described in the eighth and ninth paragraphs of this specification with relation to perfluorovinyl sulfur pentafluoride as a dielectric alone.

Practice of the invention involves insulating any two or more spaced electric elements subject to differences of electrical potential by filling the space between such elements with gaseous dielectric. In practice the dielectric medium may consist of $CF_2=CFSF_5$ alone, or as a mixture, as described above. Mixtures are advantageous, since the perfluorovinyl sulfur pentafluoride improves the dielectric strength of the medium. Partial pressures at which $CF_2=CFSF_5$ may be employed, either alone or mixed with said other gases, may vary up to about one atmosphere, at room temperature.

Keeping in mind boiling point and the liquifaction properties, the $CF_2=CFSF_5$ alone or as an additive, as described, may be used as a dielectric in any of the many situations in which a gaseous dielectric is adaptable to utilization.

Method aspects of the invention are illustrated by the above described operation of the testing cell which includes two spaced elements subject to differences of electrical potential and the filling of the space between these elements with $CF_2=CFSF_5$ alone or a mixture of $CF_2=CFSF_5$ with another gas, as described.

The testing cell also exemplifies an apparatus of the invention, that is a gas-tight casing, spaced apart electrical elements therein adapted to be subjected to differences of electrical potential, and gaseous $CF_2=CFSF_5$ alone or mixed with another gas, disposed within the casing.

It is not intended that practice of the invention be limited to a method or apparatus by the particular procedure and apparatus above described. The principles of the invention, from the standpoint of method, apply to any situation in which gaseous dielectric may be used, and apparatus of the invention comprises other electrical equipment, such as generators, motors, transformers, circuit interrupters, coaxial cables, and X-ray tube housings, to the extent that such equipment includes a gas-tight casing, spaced electrical elements therein adapted to be subjected to differences of electrical potential, and a gaseous insulator comprising, and in one embodiment consisting of, $CF_2=CFSF_5$ alone or mixed with another gas or gases between the subject elements.

We claim:

1. Apparatus comprising a gas-tight casing, spaced electrical elements therein adapted to be subjected to differences of electrical potential, and a gaseous insulator between said elements consisting essentially of perfluorovinyl sulfur pentafluoride.

2. Apparatus comprising a gas-tight casing, spaced electrical elements therein adapted to be subjected to differences of electrical potential, and a gaseous insulator between said elements consisting essentially of a mixture of perfluorovinyl sulfur pentafluoride and another gaseous dielectric selected from the group consisting of $SF_6$ and $N_2$.

3. Apparatus comprising a gas-tight casing, spaced electrical elements therein adapted to be subjected to differences of electrical potential, and a gaseous insulator between said elements essentially consisting of perfluorovinyl sulfur pentafluoride and other dielectric gases.

References Cited

UNITED STATES PATENTS

| 2,221,670 | 11/1910 | Cooper | 252—66 XR |
| 2,751,414 | 6/1956 | Miller | 252—66 XR |
| 2,989,577 | 6/1961 | Berg | 252—66 XR |
| 3,131,217 | 4/1964 | Ray | 260—543 |

JOHN D. WELSH, Primary Examiner

U.S. Cl. X.R.

252—63.7